United States Patent [19]

Machida et al.

[11] Patent Number: 4,611,228

[45] Date of Patent: Sep. 9, 1986

[54] SCAN LINE SYNCHRONIZER

[75] Inventors: Toyotaka Machida, Kashiwa; Shigeharu Ueguri, Ibaraki; Hiroaki Matsumoto, Mitsukaido; Akira Nakamura; Tatsuya Shinyagaito, both of Iwai, all of Japan

[73] Assignee: Victor Company of Japan, Ltd., Yokohama, Japan

[21] Appl. No.: 652,563

[22] Filed: Sep. 20, 1984

[30] Foreign Application Priority Data

Sep. 20, 1983 [JP] Japan ................................ 58-173957

[51] Int. Cl.[4] ............................................... H04N 5/04

[52] U.S. Cl. .................................... 358/149; 358/903; 375/106; 340/814

[58] Field of Search ............... 358/148, 149, 158, 903; 375/106, 107, 111, 118; 340/814

[56] References Cited

U.S. PATENT DOCUMENTS

| | | | |
|---|---|---|---|
| 2,752,424 | 6/1956 | Pugsley | 358/149 |
| 3,112,364 | 11/1963 | Myles | 358/149 |
| 3,311,702 | 3/1967 | Legler | 358/149 |
| 3,567,861 | 3/1971 | Webb et al. | 358/149 |
| 3,628,159 | 12/1971 | Ellis | 358/149 |
| 4,134,131 | 1/1979 | Hopkins, Jr. | 358/149 |
| 4,253,116 | 2/1981 | Rodgers, III | 358/149 |
| 4,346,407 | 8/1982 | Baer et al. | 358/149 |
| 4,520,393 | 5/1985 | Zwijsen et al. | 358/149 |

FOREIGN PATENT DOCUMENTS 2711992 5/1980 Fed. Rep. of Germany .

*Primary Examiner*—James J. Groody
*Assistant Examiner*—Michael D. Parker
*Attorney, Agent, or Firm*—Cushman, Darby & Cushman

[57] ABSTRACT

Disclosed is a synchronizer for establishing synchronism between horizontal and vertical sync pulses of a non-interlaced video signal and those of an interlaced video signal, the number of non-interlaced scan lines being smaller by $2n-1$ than the interlaced scan lines, where n is an integer equal to or greater than unity. Two variable frequency clocks are generated, one having a higher frequency variable as a function of a phase difference between the horizontal sync pulses of the two video signals and the other having one half the higher frequency. A first period is defined which runs from a non-interlaced horizontal sync of first occurrence in a given field to a horizontal sync of $(n-1)$th occurrence in the given field and a second period is defined that runs from the non-interlaced horizontal sync of first occurrence in a subsequent field to a horizontal sync of n-th occurrence in the subsequent field. The higher frequency clock is normally used to generate the non-interlaced horizontal and vertical sync and the lower frequency clock is used instead when vertical sync pulses of the two video signals are mismatched in phase and during the first and second periods to compensate for the difference in scan line number.

12 Claims, 6 Drawing Figures

SCAN LINE SYNCHRONIZER

BACKGROUND OF THE INVENTION

The present invention relates generally to apparatus which permit video signals of different scan formats to be superimposed on a common display according to a predetermined priority, and more particularly to a scan line synchronizer for establishing synchronism between horizontal and vertical synchronization pulses of a first video signal and those of a second video signal, there being a difference of (2n−1) horizontal scan lines between the first and second video signals.

Recent advances in IC and LSI technologies have brought about significant cost reduction and improvements in computers. Personal computers, now available at modest prices, find extensive use in businesses and households. With the ever increasing trend toward the widespread use of personal computers, demands have arisen for a device that permits the personal computers to be coupled with an external video source such as television or video recorders for the purpose of superimposing the image of the external source with the computer-generated graphics and characters on a common display unit.

However, the scan formats of the signals generated by computer and external source often differ from one another. A conventional circuit that permits coupling of such signals is costly and only available for special business applications.

SUMMARY OF THE INVENTION

It is therefore an object of the present invention to provide a scan line synchronizer which is simple and inexpensive.

A scan line synchronizer of the invention establishes synchronism between horizontal and vertical synchronization pulses of a first video signal and horizontal and vertical synchronization pulses of a second video signal, the numbers of horizontal and vertical synchronization pulses of the first video signal being such that scan lines are produced in a non-interlaced format on first and second fields of a frame, and the numbers of horizontal and vertical synchronization pulses of the second video signal being such that scan lines are produced in an interlaced format on first and second fields of a frame, the number of the scan lines produced on each frame by the first video signal being smaller by 2n−1 than the scan lines produced on each frame by the second video signal, where n is an integer equal to or greater than unity.

According to the invention, the frequency of a clock signal is divided by a frequency divider to generate the horizontal and vertical synchronization pulses of the first, or non-interlaced video signal and a phase difference between the horizontal synchronization pulses of the first and second video signals. A higher frequency clock is generated having a frequency variable as a function of the detected phase and a lower frequency clock is generated having a frequency which is variable as a function of the phase difference and is one half the higher frequency. For selectively applying the higher and lower frequency clocks to the frequency divider, phase match and phase mismatch between the vertical synchronization pulses of the first and second video signals are detected. A first period is defined which runs from a horizontal sync of first occurrence in a given field of the first video signal to a horizontal sync of (n−1)th occurrence in the given field and a second period is defined that runs from the horizontal sync of first occurrence in a subsequent field of the first video signal to a horizontal sync of n-th occurrence in the subsequent field. The higher frequency clock is normally applied to the frequency divider and the horizontal sync of the video signals are phase-locked with each other. The lower frequency clock is applied instead both during the phase mismatch to reestablish phase match and during the defined first and second periods to compensate for the difference in scan line number.

BRIEF DESCRIPTION OF THE DRAWINGS

The present invention will be described in further detail with reference to the accompanying drawings, in which.

DETAILED DESCRIPTION

Figure 1:
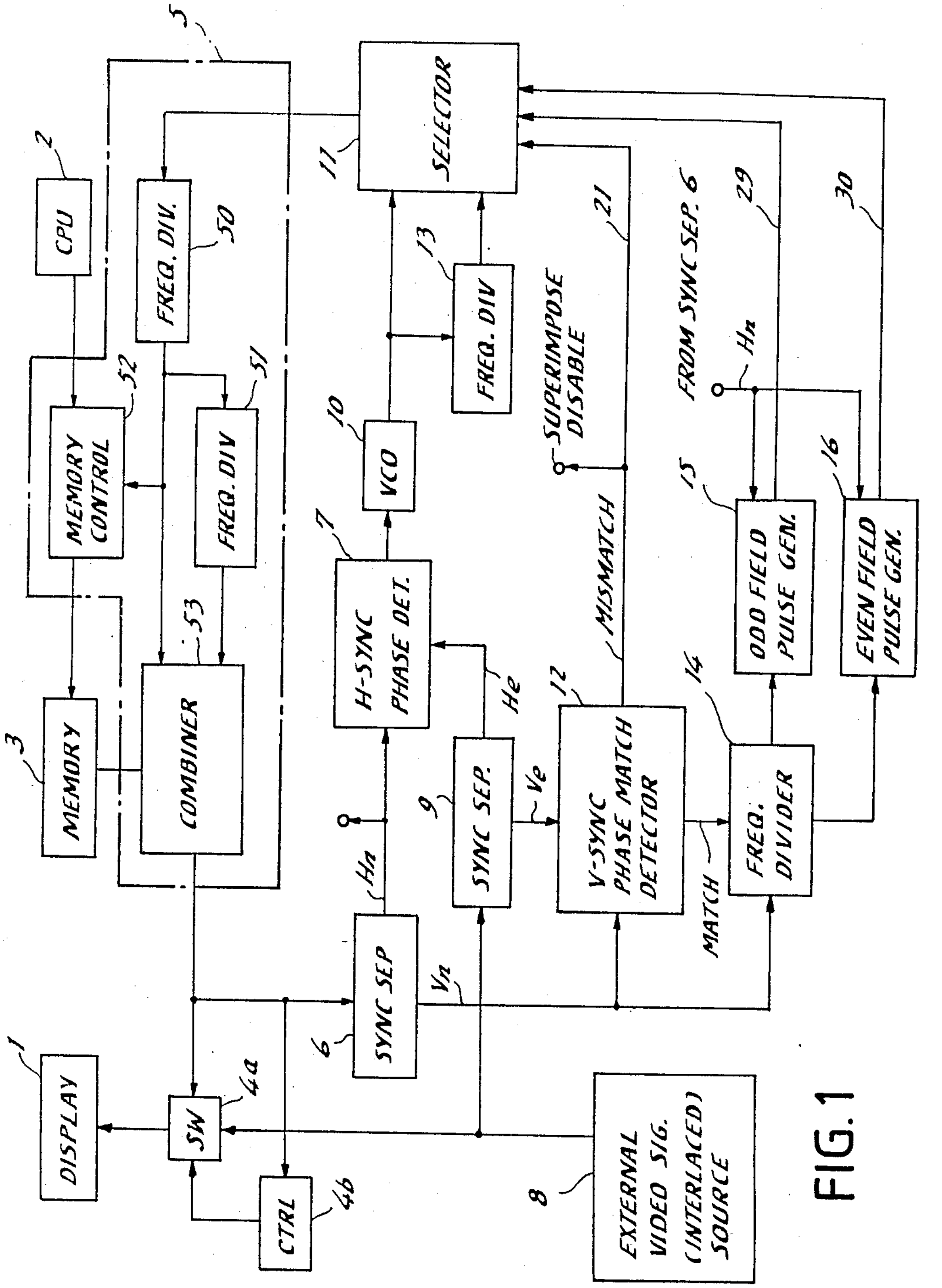
FIG. 1 is a block diagram of a scan line synchronizer according to one embodiment of the invention.

Referring now to FIG. 1, there is shown a line synchronizer of the present invention. Non-interlaced video signal from a video controller 5 is applied to one terminal of a high-speed electronic switch **4*a* and interlaced video signal from an external video source 8 is applied to another terminal of switch 4*a*. A switch control circuit 4*b* connects the interlaced video signal to the display 1** of a personal computer and switches to the non-interlaced video signal when the latter exceeds a predetermined level.

Video controller 5 (available from Texas Instruments under the model TMS 9928A) comprises a frequency divider 50 which divides the frequency of clock pulses applied thereto to generate a horizontal sync Hn which is applied to a second frequency divider 51 that generates a vertical sync pulse Vn. The horizontal sync is applied to a memory control 52 including an address counter to address the memory 3 of a video display terminal, or personal computer. The memory is also addressed through memory control 52 from the central processing unit 2 of the computer to store computer-generated video information. Horizontal and vertical sync pulses are fed to a combiner 53 and combined with the luminance component of the video signal read out of memory 3. The horizontal sync pulse Hn is so generated as to create a frame comprising an even number of horizontal scan lines. The non-interlaced frame is divided into odd and even fields each having an equal number of horizontal lines, and for this reason, the vertical sync pulse Vn is generated at field intervals and horizontal scan lines in each field overlap with those of the other field on display 1. It is to be noted that the number of non-interlaced horizontal scan lines is smaller than that of the interlaced scan lines by (2n−1), where n is an integer equal to or greater than unity.

The synchronizer includes a sync separator 6 connected to the output of controller 5 to separate the non-interlaced horizontal sync pulses Hn and vertical sync pulses Vn from the luminance signal supplied from video controller 5. Likewise, a second sync separator 9 is connected to the external video source 8 to separate the interlaced horizontal sync pulses He and vertical sync pulses Ve from the luminance signal supplied from external source 8. The separated horizontal sync pulses Hn and He are presented to a horizontal sync phase detector 7 to generate a DC signal representing the phase difference between the two horizontal sync pulses, the phase difference signal being applied to a voltage-controlled oscillator 10 whose output is coupled to a selector 11 as a higher frequency clock. The frequency of the output of VCO 10 is halved by a frequency divider 13 and fed to selector 11 as a lower frequency clock. As will be described, selector 11 is essentially a gate circuit whose output is connected to frequency divider 50 and which is arranged to normally pass the higher frequency clock to divider 50 to establish a phase lock between horizontal sync pulses Hn and He and is switched to pass the lower frequency clock 13 instead to delay the clock timing of the video controller 5 for a period corresponding to the difference between the time of occurrences of vertical sync pulses Vn and Ve when these pulses coincide with each other.

To this end, a V-sync phase match detector 12 is connected to sync separators 6 and 9 to detect a phase match between vertical sync pulses Vn and Ve to enable a frequency divider 14 to halve the frequency of vertical sync Vn. Phase match detector 12 also detects a phase mismatch between these vertical sync pulses and provides a mismatch signal on lead 21 to selector 11 to reesteblish vertical phase lock.

Frequency divider 14 provides complementary outputs having one-half the frequency of the vertical sync Vn and feeds them alternately to an odd field pulse generator 15 and an even field pulse generator 16. These pulse generators are responsive to horizontal sync pulses Hn from separator 6 so that odd field pulse generator 15 generates a pulse having a duration equal to n horizontal scan lines immediately following the start of each odd-numbered field and even field pulse generator 16 generates a pulse having a duration equal to n−1 horizontal lines immediately following the start of each even-numbered field. These pulses are applied through lines 29 and 30 to selector 11. Selector 11 is arranged to pass the output of VCO 10 to frequency divider 50 as a clock pulse or pass the output of frequency divider 13 instead.

The period of frequency divider 50 and hence the interval between successive horizontal sync pulses Hn is doubled. During a period immediately following the clock frequency being switched to the half value, the frequency of VCO 10 remains unchanged due to its inherent delay response. Therefore, horizontal sync Hn from video controller 5 occurs at twice as longer intervals than normal and the duration of output pulse from odd field pulse generator 15 accordingly prolongs until the n-th of such horizonal sync pulse Hn occurs. As a result, n horizontal lines exist in the non-interlaced signal within a period corresponding to normal 2n horizontal lines at the start of each odd field. In like manner, even field pulse generator 16 provides an output pulse having a duration corresponding to normal 2(n−1) horizontal lines and (n−1) horizontal lines exist in the non-interlaced signal within that period immediately following the start of each even field. With these delayed action, the vertical sync Vn is made to coincide with the vertical sync Ve.

If vertical sync pulses Vn and Ve become out of phase with each other, V-sync phase match detector 12 provides a mismatch output which is fed to selector 11 through line 21 to cause it to switch its output to frequency divider 13 to halve the clock frequency until phase match occurs again between them. The phase mismatch signal is also applied to the personal computer to prevent the out-of phase condition from appearing on the display.

Figure 2:
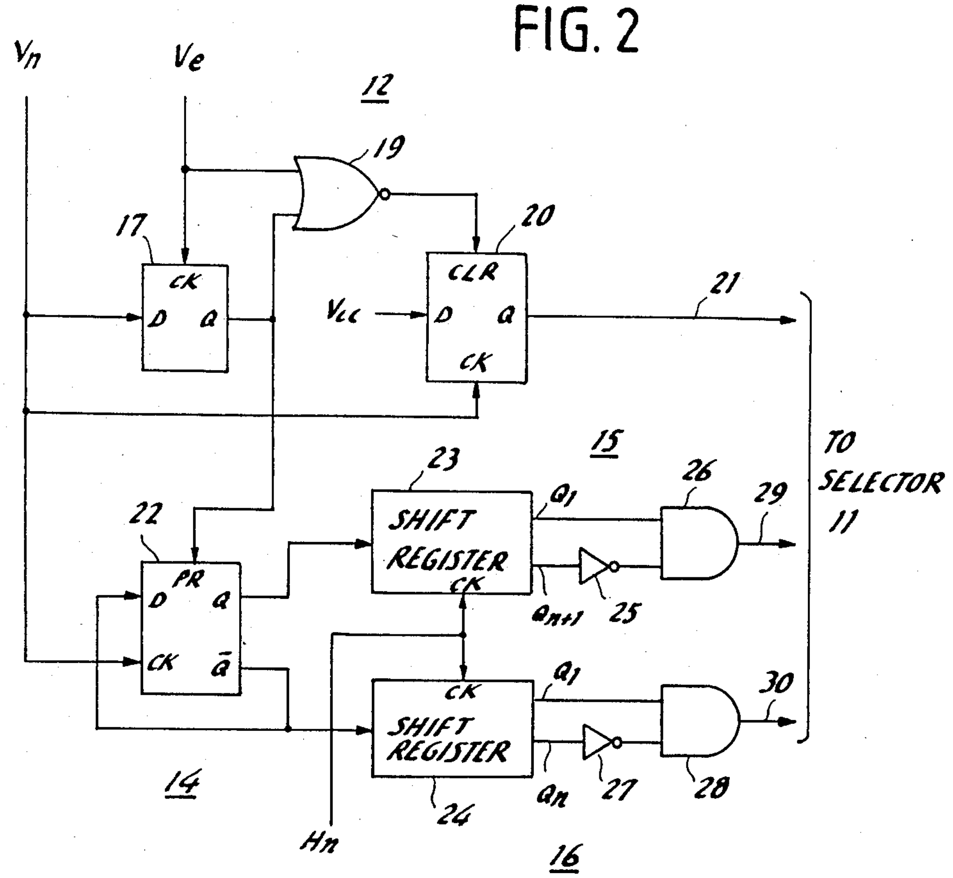
FIG. 2 is a block diagram illustrating the detail of the V-sync phase match-mismatch detector, frequency divider and pulse generators of FIG. 1.
Figure 3:
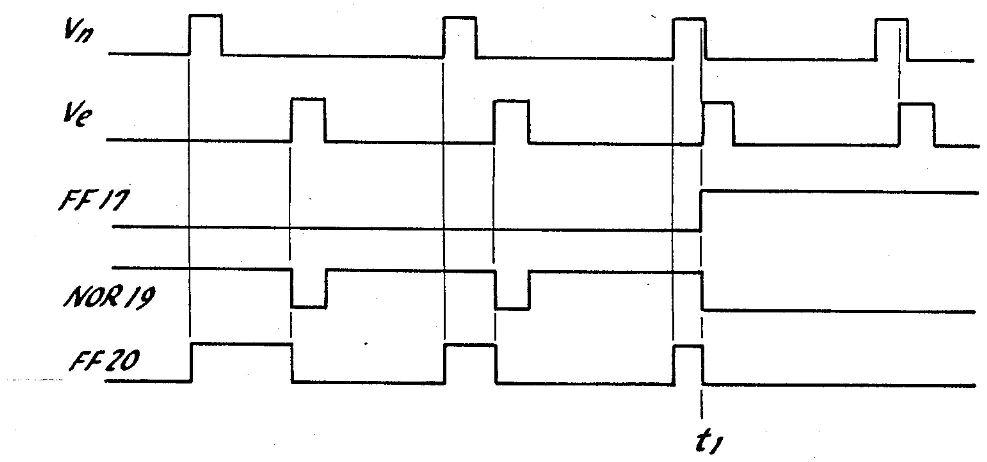
FIG. 3 is a timing diagram associated with FIG. 2.
Figure 4:
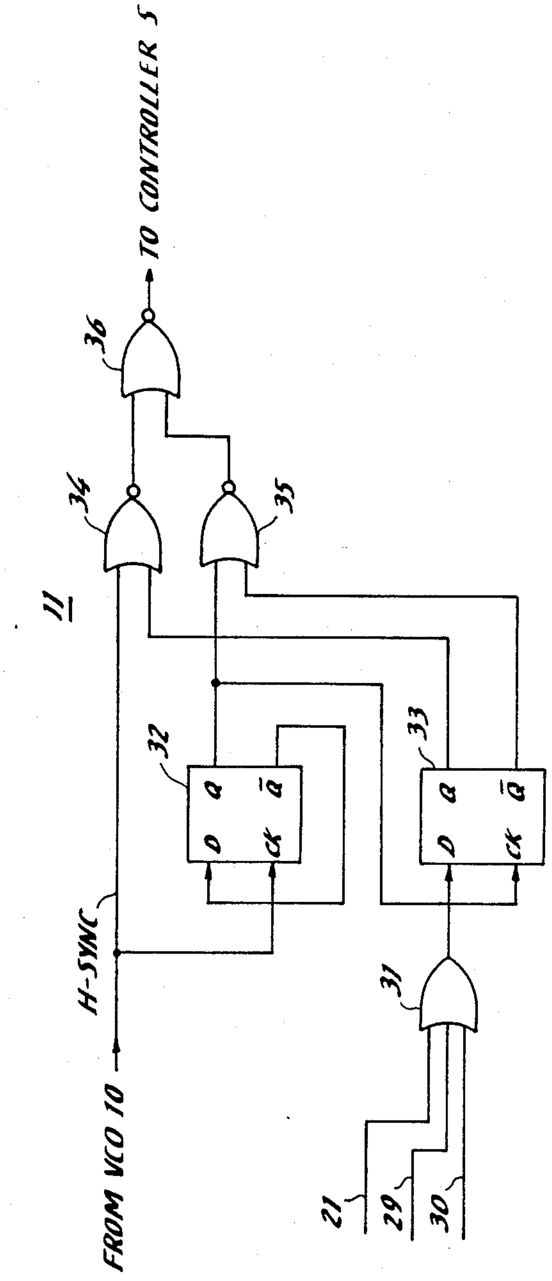
FIG. 4 is a block diagram illustrating the detail of a frequency divider and selector of FIG. 1.

Full understanding of the present invention may be had with reference to FIGS. 2 to 4. In FIG. 2, details of V-sync phase match detector 12, frequency divider 14, pulses generators 15 and 16 are illustrated. Phase match detector 12 comprises D-type flip-flops 17 and 20 and a NOR gate 19. Vertical sync Ve from separator 9 is applied to the clock input of flip-flop 17 and vertical sync Vn from separator 6 is applied to the D input of flip-flop 17 and to the clock input of a second D-type flip-flop 20 whose D input is biased by a voltage source at a potential Vcc. The clock input and Q output of flip-flop 17 are connected to inputs of a NOR gate 19 whose output is coupled to the clear input of flip-flop 20. The operation of the phase match detector 12 will be visualized with reference to a timing diagram shown in FIG. 3. When vertical sync pulses Vn and Ve become out of phase, the Q output of flip-flop 17 changes to the low level potential of the D input in response to vertical sync Ve, and if such out-of-phase condition exists until time $t_1$ the Q output of flip-flop 17 remains low until $t_1$ and enables NOR gate 19 to pass vertical sync Ve in the form of negative-going pulses to flip-flop 20. During the time when Vn and Ve are out of phase, flip-flop 20 switches to a high output state in response to the leading edge of vertical sync Vn and goes low in response to the leading edge of the negative-going pulses from NOR gate 20. Thus, flip-flop 20 generates output pulses having a duration proportional to the phase difference between sync pulses Vn and Ve. When pulses Vn and Ve coincide with each other, flip-flop 17 switches to a high output state and causes NOR gate 19 and flip-flop 20 to switch to a low output state. The high level output from flip-flop 20 is fed through line 21 to selector 11.

The phase match signal from the detector 12 is taken from the Q output of flip-flop 17 and applied to the preset input of a D-type flip-flop 22 having its complementary Q output coupled to the D input terminal to operate as the frequency divider 14 of FIG. 1. Vertical sync Vn is applied to the clock input of flip-flop 22. The true and complementary Q outputs of flip-flop 22 alternately switch to high voltage level at times corresponding respectively to the beginning of odd and even fields.

Odd field pulse generator 15 comprises a shift register 23, an inverter 25 coupled to the $Q_{n+1}$ output terminal of shift register 23 and an AND gate 26 having a first input connected to the $Q_1$ output of register 23 and a second input connected to the output of inverter 25. Shift register 23 is in receipt of the Q output of flip-flop 22 to successively shift it in response to horizontal sync pulses Hn supplied to its clock terminal. The output of AND gate 26, which is coupled by lead 29 to selector 11, goes high in response to the horizontal sync Hn of first occurrence in a given odd field and goes low when the shifted sync Vn arrives at the $Q_{n+1}$ output terminal in response to the n-th horizontal sync in the given odd field.

Even field pulse generator 16 is similarly formed by shift register 24, inverter 27, and AND gate 28 whose output is coupled by lead 30 to selector 11. Shift register 24 receives the complementary Q output of flip-flop 22 and shifts it in response to sync pulses Hn and applies it through the $Q_1$ terminal to a first input of AND gate 28 and through the $Q_n$ output to inverter 27 and thence to the second input of AND gate 28. The output of AND gate 28 is at high voltage level during a period from the horizontal sync Hn of first occurrence in a subsequent even field to the (n−1)th horizontal sync Hn of the subsequent even field.

In FIG. 4, selector 11 comprises an OR gate 31, a D-type flip-flop 33 and NOR gates 34, 35 and 36. A D-type flip-flop 32 constitutes the frequency divider 13 of FIG. 1 by having its complementary Q output coupled to its D input and dividing the frequency of output from VCO 10 fed to its clock input and generating a Q output at half the input frequency. OR gate 31 takes input signals through lines 21, 29 and 30 from phase match detector 12, pulse generators 15 and 16, the output of OR gate 31 being fed to the D input of flip-flop 33. The clock input of flip-flop 33 is connected to the Q output of flip-flop 32 to change the binary states of true and complementary Q output terminalas of flip-flop 33 to the binary state of its D input in response to the leading edge of horizontal sync Hn.

NOR gate 34 passes the higher frequency clock from VCO 10 to NOR gate 36 and thence to frequency divider 50 of controller 5 when the Q output of flip-flop 33 is low and during this time the complementary Q output of flip-flop 33, which is high, inhibits NOR gate 35 from passing the lower frequency clock from the Q output of flip-flop 32 to NOR gate 36. When a high voltage signal is applied through any one of leads 21, 29 and 30, flip-flop 33 inhibits NOR gate 34 and enables NOR gate 35 to pass the lower frequency clock to NOR gate 36 and thence to controller 5.

As will be seen from the above, horizontal sync Hn is reduced to one half its normal frequency in response to the pulse supplied from odd field pulse generator 15 to flip-flop 33, increasing twice as long the interval with which shift register 23 is clocked. The high level output of odd field pulse generator 15 thus continues for a period equal to 2n horizontal scan lines which would normally occur and during that period n scan lines that occur at twice the normal interval and coincide with alternate lines of the interlaced signal. Similarly, sync Hn is reduced to one half the normal frequency in response to the pulse from pulse generator 16 on lead 30, increasing twice as long the interval with which shift register 24 is clocked. The output of even field pulse generator 16 thus continues for a period corresponding to 2(n−1) horizontal scan lines which would normally occur and during that period n−1 horizontal lines that actually occur at twice the normal interval and coincide with alternate lines of the interlaced signal.

The frame interval of the non-interlaced video signal is increased by an amount equal to the period of 2n−1 horizontal lines and therefore the horizontal and vertical sync pulses of the non-interlaced format are synchronized with those of the interlaced format.

Whenever there is a phase mismatch between V-sync pulses Vn and Ve, the output of flip-flop 20 goes high and is fed on lead 21 to flip-flop 33 to reduce the clock frequency to one half the normal to restore phase match, thus conditioning the frequency divider 14 to initiate the line difference compensation.

Figure 5:
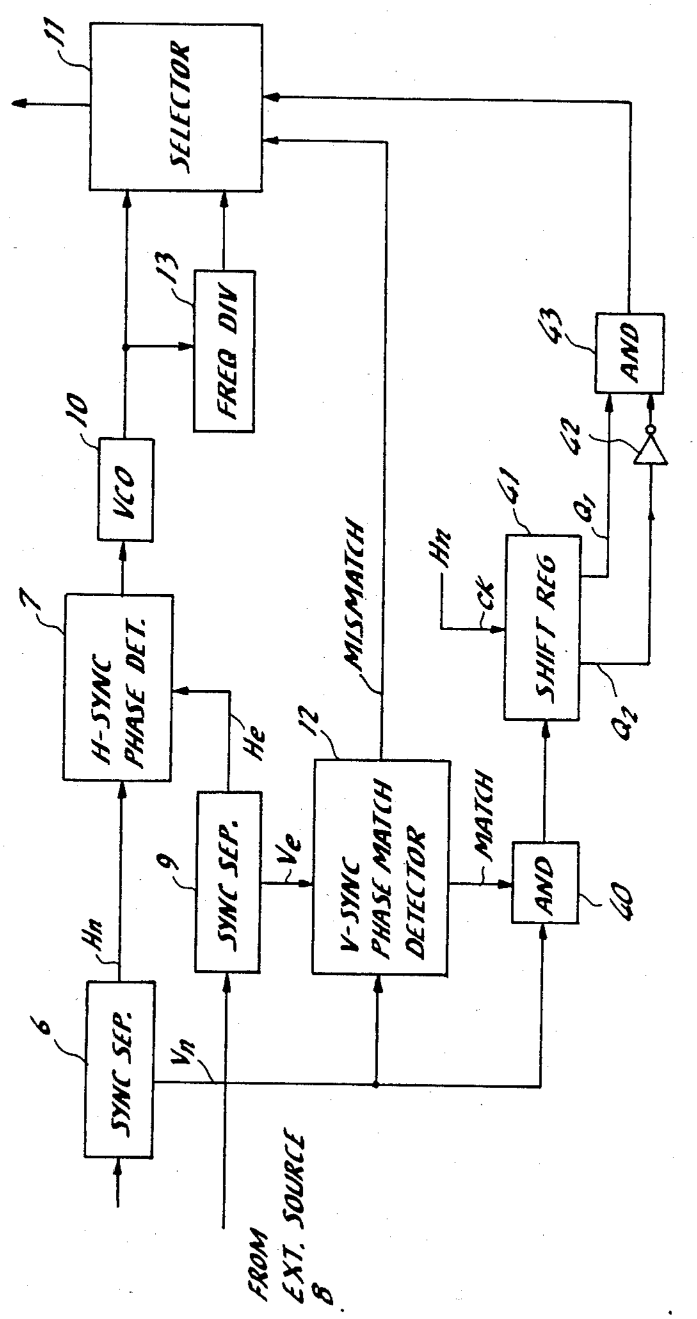
FIG. 5 is a block diagram of the synchronizer according to a modified embodiment of the invention.

If the integer n is unity, the line synchronizer of FIG. 1 can be simplified as shown in FIG. 5. In this modification, the frequency divider 14 and pulse generators 15 and 16 of FIG. 1 are replaced with AND gate 40, shift register 41, inverter 42 and AND gate 43. The first input of AND gate 43 is connected to the $Q_1$ output of shift register 41 and the second input is connected to the output of inverter 42 which is connected from the $Q_2$ output of shift register. AND gate 40 is enabled by the phase match signal from detector 12 to pass V-sync pulse Vn to shift register 41. AND gate 43 generates a pulse in response to the beginning of the odd field with a duration equal to two horizontal lines.

Figure 6:
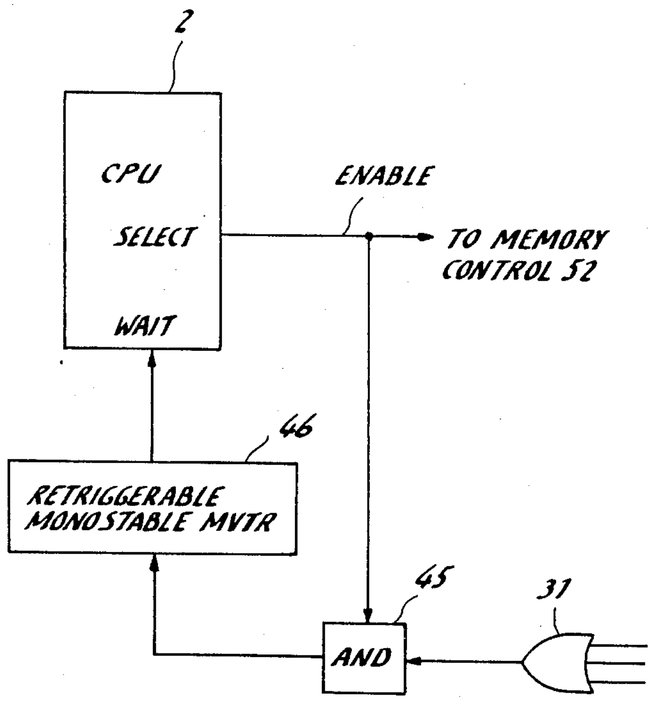
FIG. 6 is a block diagram for disabling the CPU of a personal computer during phase mismatch.

When video controller 5 is driven at one half the normal clock frequency, it is desirable to prevent the CPU 2 from addressing the memory to ensure against unreliable operations which would otherwise occur due to the difference between the clock frequency and the constant time base of the computer. FIG. 6 illustrates an arrangement for avoiding such undesirable computer operations. The output of OR gate 31 is applied to one input of an AND gate 45. A memory enable signal, which is supplied from the CPU to memory control 52, is supplied to the second input of AND gate 45. The output of AND gate 45 is connected to a retriggerable monostable multivibrator 46. When the enable signal is applied to memory control 52, AND gate 45 is enabled, passing the output of OR gate 31 to monostable multivibrator 46 to cause it to produce a pulse of a predetermined duration longer than the length of time in which the video controller is driven at one half the normal clock frequency. Monostable multivibrator 46 will be retriggered if vertical sync mismatch occurs at short intervals. The output of monostable 45 is applied to a "wait" input of the CPU to prevent it from addressing the memory until the normal clock frequency is resumed.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An apparatus for establishing synchronism between horizontal and vertical synchronization pulses of a first video signal and horizontal and vertical synchronization pulses of a second video signal, the numbers of horizontal and vertical synchronization pulses of the first video signal being such that scan lines are produced in a non-interlaced format on first and second fields of a frame, and the numbers of horizontal and vertical synchronization pulses of the second video signal being such that scan lines are produced in an interlaced format on first and second fields of a frame, the number of the scan lines produced on each frame by said first video signal being smaller by 2n−1 than the scan lines produced on each frame by said second video signal, where n is an integer equal to or greater than unity, comprising:

- first means for dividing the frequency of clock pulses applied thereto and generating the horizontal and vertical synchronization pulses of said first video signal;
- second means for detecting a phase difference between the horizontal synchronization pulses of said first and second video signals;

third means for generating a signal having a higher frequency variable as a function of the phase detected by the phase difference detecting means and a signal having a lower frequency variable as a function of said phase difference, the lower frequency being one half of said higher frequency;

fourth means for detecting a phase match and a phase mismatch between the vertical synchronization pulses of said first and second video signals;

fifth means responsive to said phase match for defining a first period running from a horizontal synchronization pulse of first occurrence in a given field of said first video signal to a horizontal synchronization pulse of (n−1)th occurrence in said given field and defining a second period running from a horizontal synchronization pulse of first occurrence in a subsequent field of said first video signal to a horizontal synchronization pulse of n-th occurrence in said subsequent field; and sixth means for normally applying said higher frequency signal as said clock pulses to said first means and applying said lower frequency signal to said first means instead of said higher frequency signal both during said phase mismatch and during said defined first and second periods.

2. An apparatus as claimed in claim 1, wherein said fifth means comprises a pulse generating means operable during said phase match for generating a pulse having a leading edge coinciding with said first horizontal synchronization pulse of said given field and a trailing edge coinciding with a second horizontal synchronization pulse of said given field, said pulse defining said first period.

3. An apparatus as claimed in claim 2, wherein said pulse generating means comprises:

a shift register having a clock input terminal responsive to the horizontal sychronization pulse of said first video signal, the shift register being arranged to shift the vertical synchronization pulse of said first video signal during said phase match in step with the receipt of said horizontal synchronization pulse at said clock input terminal, said shift register having a first output terminal from which the shifted vertical synchronization pulse appears when the horizontal synchronization pulse of said first occurrence is received at said clock terminal and a second output from which the shifted vertical synchronization pulse appears when said second horizontal synchronization pulse is received at said clock terminal;

an inverter connected to said second output terminal; and a coincidence gate having a first input terminal connected to said first output terminal and a second input terminal connected to the output of said inverter and producing a pulse defining said first period.

4. An apparatus as claimed in claim 1, wherein said fifth means comprises:

first pulse generating means for generating a first pulse having a leading edge coinciding with said first horizontal synchronization pulse of said given field and a trailing edge coinciding with the (n−1)th horizontal synchronization pulse of said given field, said first pulse defining said first period; and second pulse generating means for generating a second pulse having a leading edge coinciding with said first horizontal synchronization pulse of said subsequent field and a trailing edge coinciding with the n-th horizontal synchronization pulse of said subsequent field, said second pulse defining said second period.

5. An apparatus as claimed in claim 2, wherein said sixth means comprises a gate circuit for normally passing said higher frequency signal to said first means and passing said lower frequency signal thereto instead of said higher frequency signal in response to said phase mismatch and said pulse defining said first period.

6. An apparatus as claimed in claim 4, wherein said sixth means comprises a gate circuit for normally passing said higher frequency signal to said first means and passing said lower frequency signal thereto instead of said higher frequency signal in response to said phase mismatch and said first and second pulses respectively defining said first and second periods.

7. An apparatus as claimed in claim 1, wherein said fourth means comprises bistable means having a first input terminal responsive to the vertical synchronization pulse of the first video signal and a second input terminal responsive to the vertical synchronization pulse of the second video signal and an output terminal which changes its binary state to the binary state of said first input terminal at the time said second input terminal receives said vertical synchronization pulse of the second video signal so that said output terminal assumes a first binary state representing said phase match when said vertical synchronization pulses are in phase or a second binary state representing said phase mismatch when said vertical synchronization pulses are out of phase, and means for generating a pulse having a leading edge coinciding with the leading edge of the vertical synchronization pulse of said first video signal and a trailing edge coinciding with the leading edge of the vertical synchronization pulse of the second video signal when said output terminal assumes said second binary state and applying said pulse to said sixth means as an indication of said phase mismatch.

8. An apparatus as claimed in claim 7, wherein said fifth means comprises:

a frequency divider effective in response to said bistable means assuming said first binary state for dividing the frequency of the vertical synchronization pulse of said first video signal and generating first and second complementary output signals at one half the frequency of the last-mentioned vertical synchronization pulse;

a first shift register having a clock input terminal responsive to the horizontal sychronization pulse of said first video signal, the shift register being arranged to shift the first output signal of said frequency divider in step with the receipt of said horizontal synchronization pulse at said clock input terminal, said shift register having a first output terminal from which the shifted first output signal appears when the horizontal synchronization pulse of said first occurrence is received at said clock terminal and a second output from which the shifted first output signal appears when the horizontal synchronization pulse of said n-th occurrence is received at said clock terminal;

a first inverter connected to said second output terminal of the first shift register;

a first coincidence gate having a first input terminal connected to the first output terminal of said first shift register and a second input terminal connected to the output of said first inverter for generating a pulse defining said first period;

a second shift register having a clock input terminal responsive to the horizontal sychronization pulse of said first video signal, the second shift register being arranged to shift the second output signal of said frequency divider in step with the receipt of said horizontal synchronization pulse at said clock input terminal, said second shift register having a first output terminal from which the shifted second output signal appears when the horizontal synchronization pulse of said first occurrence is received at said clock terminal and a second output from which the shifted second output signal appears when the horizontal synchronization pulse of said (n−1)th occurrence is received at said clock terminal;

a second inverter connected to said second output terminal of the second shift register; and a second coincidence gate having a first input terminal connected to the first output terminal of said second shift register and a second input terminal connected to the output of said second inverter for generating a pulse defining said second period.

9. A combination comprising:

a personal computer having means for dividing the frequency of clock pulses applied thereto and generating horizontal and vertical synchronization pulses of a first video signal, the numbers of said horizontal and vertical synchronization pulses being such that scan lines are produced in a non-interlaced format on first and second fields of a frame;

a display unit;

a switching means for selectively applying said first video signal and a second video signal from an external source to said display unit, the second video signal having horizontal and vertical synchronization pulses, and the numbers of horizontal and vertical synchronization pulses of the second video signal being such that scan lines are produced in an interlaced format on first and second fields of a frame, the number of the scan lines produced on each frame by said second video signal being greater by 2n−1 than the scan lines produced on each frame by said first video signal, where n is an integer equal to or greater than unity;

a first sync separator for extracting the horizontal and vertical synchronization pulses from said first video signal;

a second sync separator for extracting the horizontal and vertical synchronization pulses from said second video signal;

a phase detector for detecting a phase difference between the horizontal synchronization pulses extracted respectively by said first and second sync separators;

a variable frequency oscillator connected to the output of said phase detector;

a divide-by-2 frequency divider coupled to the output of said variable frequency oscillator;

a phase match-mismatch detector for detecting a phase match and a mismatch between the vertical synchronization pulses of said first and second video signals and generating a phase match signal and a phase mismatch signal; and a pulse generating circuit responsive to said phase match signal for generating a first pulse having a leading edge coinciding with a horizontal synchronization pulse of first occurrence in a given field of said first video signal and a trailing edge coinciding with a horizontal synchronization pulse of (n−1)th occurrence in said given field and generating a second pulse having a leading edge coinciding with a horizontal synchronization pulse of first occurrence in a subsequent field of said first video signal and a trailing edge coinciding with a horizontal synchronization pulse of n-th occurrence in said subsequent field; and a gate circuit means for normally passing the output of said variable frequency oscillator to the sync generating means of said personal computer and passing instead the output of said frequency divider in response to said phase mismatch signal and to said first and second pulses.

10. A combination as claimed in claim 9, wherein said phase match-mismatch detector comprises:

a bistable means having a first input terminal responsive to the vertical synchronization pulse of the first video signal and a second input terminal responsive to the vertical synchronization pulse of the second video signal and an output terminal which changes its binary state to the binary state of said first input terminal at the time said second input terminal receives said vertical synchronization pulse of the second video signal so that said output terminal assumes a first binary state corresponding to said phase match signal or a second binary state corresponding to said phase mismatch; and means for generating a pulse having a leading edge coinciding with the leading edge of the vertical synchronization pulse of said first video signal and a trailing edge coinciding with the leading edge of the vertical synchronization pulse of the second video signal when said output terminal assumes said second binary state and applying said pulse to said gate circuit means as said phase mismatch signal.

11. A combination as claimed in claim 10, wherein said pulse generating circuit comprises:

a frequency divider effective in response to said bistable means assuming said first binary state for dividing the frequency of the vertical synchronization pulse of said first video signal and generating first and second complementary output signals at one half the frequency of the last-mentioned vertical synchronization pulse;

a first shift register having a clock input terminal responsive to the horizontal sychronization pulse of said first video signal, the shift register being arranged to shift the first output signal of said frequency divider in step with the receipt of said horizontal synchronization pulse at said clock input terminal, said shift register having a first output terminal from which the shifted first output signal appears when the horizontal synchronization pulse of said first occurrence is received at said clock terminal and a second output from which the shifted first output signal appears when the horizontal synchronization pulse of said n-th occurrence is received at said clock terminal;

a first inverter connected to said second output terminal of the first shift register;

a first coincidence gate having a first input terminal connected to the first output terminal of said first shift register and a second input terminal connected to the output of said first inverter for generating said first pulse;

a second shift register having a clock input terminal responsive to the horizontal sychronization pulse of said first video signal, the second shift register being arranged to shift the second output signal of said frequency divider in step with the receipt of said horizontal synchronization pulse at said clock input terminal, said second shift register having a first output terminal from which the shifted second output signal appears when the horizontal synchronization pulse of said first occurrence is received at said clock terminal and a second output from which the shifted second output signal appears when the horizontal synchronization pulse of said (n−1)th occurrence is received at said clock terminal;

a second inverter connected to said second output terminal of the second shift register; and a second coincidence gate having a first input terminal connected to the first output terminal of said second shift register and a second input terminal connected to the output of said second inverter for generating said second pulse.

12. A combination as claimed in claim 9, wherein said personal computer includes a central processing unit and a memory, said central processing unit generating a control signal for addressing said memory, further comprising a coincidence gate for detecting a coincidence between said control signal and said phase mismatch signal and said first and second pulses and generating a coincidence output and means responsive to said coincidence output for causing said central processing unit to await the execution of said control signal until the termination of a series of said coincidence outputs.

* * * * *